United States Patent [19]

Minati et al.

[11] Patent Number: 4,485,266
[45] Date of Patent: Nov. 27, 1984

[54] TERMINATION FOR A SUPERCONDUCTING POWER TRANSMISSION LINE INCLUDING A HORIZONTAL CRYOGENIC BUSHING

[75] Inventors: Kurt F. Minati, Northport; Gerry H. Morgan, Patchogue; Andrew J. McNerney, Shoreham; Felix Schauer, Upton, all of N.Y.

[73] Assignee: The United States of America as represented by the United States Department of Energy, Washington, D.C.

[21] Appl. No.: 403,220

[22] Filed: Jul. 29, 1982

[51] Int. Cl.³ .................... H01B 7/34; H01B 17/26
[52] U.S. Cl. .................... 174/15 CA; 174/15 BH; 174/15 C
[58] Field of Search .......... 174/15 BH, 15 CA, 15 S, 174/15 C

[56] References Cited

U.S. PATENT DOCUMENTS

| | | | |
|---|---|---|---|
| 3,764,726 | 10/1973 | Kohler et al. | 174/15 BH |
| 3,792,220 | 2/1974 | Yoshioka et al. | 174/15 BH X |
| 3,885,636 | 5/1975 | Hildebrandt | 174/15 C |
| 3,902,000 | 8/1975 | Forsyth et al. | 174/15 BH |
| 3,987,238 | 10/1976 | Reinke et al. | 174/15 C |

OTHER PUBLICATIONS

Mauser, S. F. et al.; "Development of a 138KV Superconducting Cable Termination"; IEEE Transactions on Power Apparatus and Systems; vol. PAS-95, No. 3; May–Jun. 1976; pp. 909–914.

Abramov, G. I. et al.; "Design and Investigation of a High-Voltage Bushing for a Cable Cooled by Liquid Nitrogen"; Proceedings of the Fourth U.S.-U.S.S.R Symposium on Superconducting Power Transmission; Brookhaven National Laboratory; Aug. 11, 1976; CON-F-760871; 14 pages.

Gerhold, J.; "On the Layout of Low Temperature Bushings for High AC Voltage"; Cryogenics; Jul. 1981.

Quirk, J. F.; "A High Voltage, High Current Cryogenic Bushing"; Conference Proceedings of the 15th Electrical/Electronics Insulation Conference, Chicago, IL U.S.A; (Oct. 19–22, 1981).

Primary Examiner—John Gonzales
Assistant Examiner—Morris H. Nimmo
Attorney, Agent, or Firm—Vale P. Myles; Paul A. Gottlieb; Michael F. Esposito

[57] ABSTRACT

A termination for a superconducting power transmission line is disclosed which is comprised of a standard air entrance insulated vertical bushing with an elbow, a horizontal cryogenic bushing linking the pressurized cryogenic cable environment to the ambient temperature bushing and a stress cone which terminates the cable outer shield and transforms the large radial voltage gradient in the cable dielectric into a much lower radial voltage gradient in the high density helium coolant at the cold end of the cryogenic bushing.

8 Claims, 11 Drawing Figures

TERMINATION FOR A SUPERCONDUCTING POWER TRANSMISSION LINE INCLUDING A HORIZONTAL CRYOGENIC BUSHING

BACKGROUND OF THE INVENTION

The U.S. Government has rights in this invention pursuant to Contract Number DE-AC02-76CH00016, between the U.S. Department of Energy and Associated Universities, Inc.

The subject invention relates to terminations for superconducting power transmission lines. More particularly, it relates to terminations comprising coaxial cryogenic bushings which generate no external magnetic field and are capable of operation in a horizontal position.

There are two primary functions which must be carried out by the termination of a cryogenic superconducting transmission line if such transmission lines are to prove useful. First, the termination must provide for the transition from the cryogenic superconducting environment to ambient conditions. Second, the termination must transform the large radial voltage gradient in the cable to the much lower gradient tolerable after termination. Additionally, the termination should provide a right angle elbow to allow the necessary clearance to the ground at the point where the high voltage is brought out into the atmosphere. Transformation of the voltage gradient and provision of an elbow are requirements that are common to both the termination of conventional transmission lines and superconducting lines and conventional techniques for dealing with these problems are known. However, the need to provide for a transition from cryogenic temperatures to ambient temperatures is essentially unique to superconducting lines, and presents the unique problem of supporting a temperature gradient of about 300° K. over a reasonable length while minimizing the heat flow into the cryogenic region. This problem is, of course, compounded by the fact that the low resistance metals needed to carry the high currents typical of power transmission are also excellent conductors of heat.

Cryogenic bushings have been developed and incorporated in terminations for superconducting transmission lines to deal with the temperature transition problem. Thus, U.S. Pat. No. 3,902,000 to Forsyth, et al., issued Aug. 26, 1975, and the paper "Development of a 138 kV Superconducting Cable Termination," by Mauser, et al., IEEE Transactions, May/June 1976, pp. 909-914 both describe terminations for superconducting transmission lines.

Both of these references show designs where the temperature transition takes place across a vertically oriented bushing, and such a vertical orientation is generally used for termination designs for superconducting transmission lines, since horizontal designs in the past have tended to exhibit temperature instabilities and excessive heat flow into the cryogenic region when used with the high currents and high voltages associated with power transmission. The large outer conductor diameter will usually have a temperature difference from top to bottom when the conductor is horizontal. This leads to a density difference in the helium which may result in convection currents in the helium; these convection currents may increase the axial heat flow.

The problem with a vertical cryogenic bushing is that it requires either that the cable be bent through an angle of 90 degrees, which would require too great a distance with even the most flexible cable design as yet proposed, and, of course, would be impossible with rigid cable designs, or that the termination comprise a superconducting right angle elbow. Such right angle superconducting elbows have proven difficult to design and manufacture.

Thus, it is an object of the present invention to provide a termination for a superconducting power transmission line which comprises a horizontal cryogenic bushing.

It is a further object of the subject invention to provide such a termination which minimizes the heat flow into the cryogenic region.

It is a further object of the subject invention to provide a termination which incorporates and is compatible with technology developed for the termination of conventional power transmission cables.

It is a further object of the present invention to overcome the increased axial heat flow problems exhibited by horizontal design bushings by using spiral helium flow through narrow channels.

It is a further object of the present invention to provide a temperature stabilization means at the warm end and the cold end of the horizontal cryogenic bushing.

BRIEF SUMMARY OF THE INVENTION

The disadvantages of the prior art are overcome and the objects of the subject invention are achieved by means of a termination for a cryogenic, coaxial power transmission cable comprising a cryogenic bushing for transmitting electrical power from a cryogenic region to a region of higher temperature, the bushing further comprising coaxial conductors having attached heat exchanger means or integral heat exchanger capabilities, and a coaxial electrically insulating structure between them.

The outer conductor assembly has a conductive tube spanning the distance from the warm region to the cryogenic region, and has conductive flanges electrically connected to the opposite ends of the tube. It includes a hollow extrusion with one or more channels wound around the conductive tube and in thermal contact with it, comprising a first heat exchanger means.

The inner conductor assembly of the bushing is within and coaxial with the outer conductor assembly. This inner conductor assembly further comprises cold and warm end portions extending beyond the outer conductor assembly, and a temperature transition section comprising a conductor with integral heat exchanger capability, as described below. The cold end portion comprises a first hollow conductor having a superconductive coating on its outer surface and a second heat exchanger means within the conductor. The warm end portion similarly comprises a second conductive tube, and a third heat exchanger means within the tube. The end portions and the temperature transition section are assembled by leak tight electrical connections to form a single conductor, so that the coolant may flow from the second cold end heat exchanger, through the channels of the temperature transition section, and out through the hollow center of the warm end conductor. The warm end heat exchanger is provided with a separate coolant flow, as will be more fully described below.

The temperature transition section is formed from a length of conductive material having good electrical and heat transfer capabilities, such as aluminum, and has a tubular "T" shape. The tube has at least one, and preferably a plurality of channels, for the flow of coolant passing through its length so as to increase the available heat transfer area. The tube is wound into a tight coil with the top of the "T" shape outward, and in contact from turn to turn so that the surface of the coil is substantially a cylinder with a single, continuous, spiral joint between the flanges. The joint is made leak tight by a method such as brazing, and the ends of said coil are machined flat and at right angles with the cylinder axis so that the channels are circular and opened to allow the flow of coolant through the conductor. The inner conductor assembly has a total of three heat exchanges, one of which is integral with the conductor.

A cylindrical insulating structure substantially fills the space between the inner and outer conductor assemblies, forming a leak tight seal with these assemblies, and substantially in thermal contact with these assemblies along their length so that the insulating structure is cooled by them. The structure has cold and warm end extensions beyond the outer conductor assemblies. These extensions taper from the outer conductor flanges to the end portions of the inner conductor, reducing the possibility of electrical breakdown between the inner and outer conductor.

The bushing is incorporated into a termination comprising a vacuum enclosure having a first opening for admitting an end of a superconducting cable, the opening connecting to and forming a leak tight seal with a similar opening in a second vacuum vessel containing the cable. The enclosure is also provided with a second opening, in line with the first opening allowing the warm end extension to penetrate the enclosure, the second opening connecting to and forming a leak tight seal with the warm end flange of the bushing so that the bushing is substantially contained within the enclosure, aligned with the openings and with the warm end extension and warm end portion of the inner conductor assembly projecting out of the vacuum enclosure. A pressure vessel is also mounted within the enclosure between, and aligned with, the openings. The vessel is pressurized with a coolant and has a connector adjacent to the first opening for terminating the outer pressure jacket of the cable while allowing the inner and outer conductors to penetrate into the vessel. The vessel also has an opening in line with the vacuum enclosure openings and the connector allowing the cold end extension of the bushing to penetrate into the pressure vessel and forming a leak tight seal with the cold end flange of the bushing.

Within the pressure vessel is a current carrying means for carrying the outer conductor current, electrically connected to the outer conductor of the cable and the cold end flange of the bushing, and a stress cone electrically connected to the outer conductor of the cable and the current carrying means, whereby the voltage gradient between the outer and inner conductors of the cable is transformed into a lower voltage gradient between the inner conductor and the current carrying means. The stress cone also has an axial opening which allows the inner conductor of the cable to pass through the stress cone.

A second connector is located between the stress cone and the cold end extension electrically connecting the inner conductor of the cable to the cold end portion of the inner conductor assembly of the cryogenic bushing. The connector has openings which allow the pressurized coolant in the pressure vessel to flow into or out of the center conductor of the cable and into the second heat exchanger of the inner conductor assembly.

In operation the termination may be connected to a conventional SF$_6$ insulated air entrance bushing with a right angle elbow, or to other suitable conventional power line terminating equipment. The outer shell of the air entrance bushing surrounds the projecting warm end extension of the insulating structure and is electrically connected to and forms a leak tight connection with the vacuum enclosure, thus providing a conductive path to the outer conductor assembly of the cryogenic bushing. The inner conductor of the air entrance bushing is electrically connected to the warm end portion of the inner conductor assembly of the cryogenic bushing and is hollow, providing a path through which the coolant flowing through the inner conductor assembly is returned.

The cable enters the termination through the first opening in the vacuum enclosure and the outer shell and is supported by the first connector while the inner and outer conductor of the cable go through the connector into the pressure vessel. Within the pressure vessel the outer conductor is electrically connected to the current carrying means and to the stress cone to transform the voltage gradient in the cable into a lower voltage gradient between the current carrying means and the inner conductor.

The pressure vessel is pressurized, either by connections through the vacuum enclosure to a refrigeration system which provides a flow of coolant at cryogenic temperatures, or, at the downstream end of the cable by the flow of coolant through the cable. At the downstream end of the cable, the coolant is withdrawn from the pressure vessel, expanded, and returned to the refrigeration system through the cryostat containment of the cable. Particular details of this cooling technique are described in U.S. Pat. No. 4,020,275 by John Dean, which is hereby incorporated by reference.

At either end of the cable coolant flows through the second connector into the second, cold end heat exchanger of the inner conductor assembly. The first, outer conductor heat exchanger is also connected to the pressure vessel so that the coolant flows through that heat exchanger also, flowing from the cold end to the warm. These flows cool the inner and outer conductors, intercepting most of the heat flow from the warm end of the bushing before it reaches the cryogenic region. Further, since the conductors are in contact with the insulating structure, that structure is also cooled and the heat flow through it is substantially reduced.

The coolant flow is sufficient to insure that temperatures are below the superconducting critical temperature for the colder third of the distance between the outer conductor assembly flanges. Therefore, it is preferable for some portions of the inner and outer conductor assemblies to have a coating of superconductive material to further reduce heat generated by current flow (e.g., approximately the cooler third of the temperature transition sections).

The third, warm end, heat exchanger is connected to a separate source which provides a fluid, which can be a liquid, such as a water-glycol mixture, or a gas, such as freon, but is preferably a water-glycol mixture. This heat exchanger stabilizes the temperature of the warm end of the bushing, cooling it during normal operation and warming it during periods of low current flow when it might otherwise become cold enough to liquify and freeze the SF$_6$ insulating gas of the air entrance bushing.

Thus, it may be seen that the subject invention advantageously provides a termination capable of horizontal operation.

Another advantage of the subject invention is that the bushing which forms the termination of the cryogenic superconducting cable is cooled by the coolant used in the cable; this design also provides the means by which this coolant may be introduced to and removed from that cable.

It is still a further advantage of the subject invention that it may be used in conjunction with conventional apparatus, such as air entrance bushings, or other insulated structures to form complete termination systems.

Other objects and advantages of the subject invention will become apparent to those skilled in the art from consideration of the detailed description set forth below, and of the attached drawings.

BRIEF DESCRIPTION OF THE DRAWINGS

FIGS. 1-4 are placed together, end to end, beginning with FIG. 1 on the extreme right and ending with FIG. 4 on the extreme left, the four figures taken together depict the entire termination for a superconducting cable of the present invention, from the vacuum chamber through to the air entrance bushing.

DETAILED DESCRIPTION OF AN EMBODIMENT OF THE INVENTION

Turning first to FIGS. 1 through 4, there is shown a termination according to the present invention suitable for use with a cryogenic, superconducting power transmission cable of the type described in BNL Report No. 29,291, entitled, "Test Results of AC Superconducting Cables," by Eric Forsyth, presented at the IEEE/PES Conference in Minneapolis, Minn., Sept. 20-25, 1981, which is hereby incorporated by reference. Such a cable comprises an outer jacket, coaxial outer and inner conductors, insulation separating the conductors and a strong tubular core which mechanically supports the cable. The cable is cooled by supercritical helium gas at a temperature of approximately 6 to 8 K., a flow rate of 25 g/sec$^{-1}$, and a pressure of 12 of atm., flowing through the hollow core. Periodically, along the length of the cable the supercritical helium flow is diverted from the cable, passed through an expander where the temperature and pressure are reduced, and the expanded gas is returned to the refrigeration system through a channel outside the outer jacket but within the cryostat containing the cable. A detailed description of this cooling technique is provided in the paper by G. Morgan, "Counter-flow Cooling of a Transmission Line By Supercritical Helium," *Cryogenics*, Volume 17, p. 259, 1977, which is hereby incorporated by reference.

As will be seen in the description set forth below, the termination of the subject invention is suitable for use at either the expansion or refrigeration end of the cable.

Figure 1:
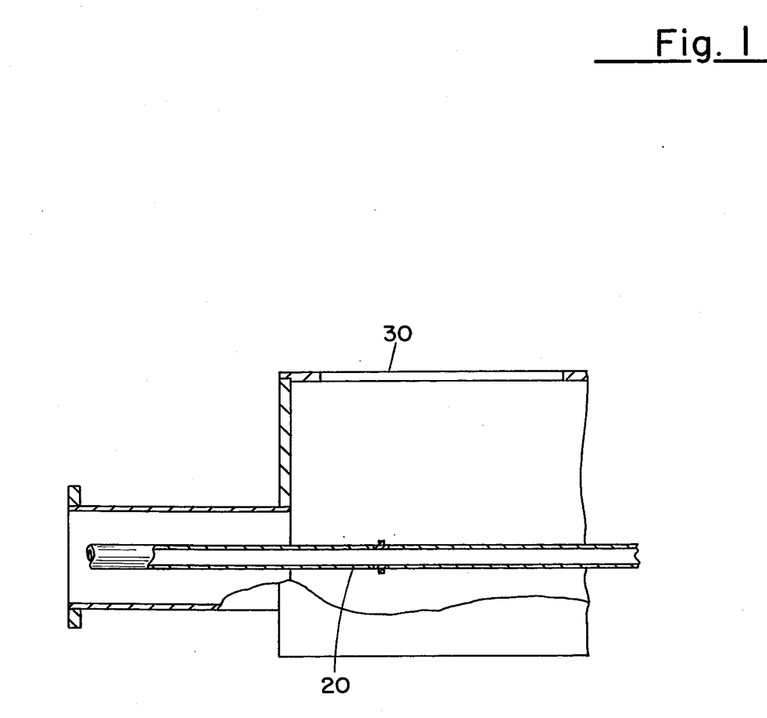
FIG. 1 is an axial view, partly in section and partly broken away, of the vacuum chamber through which the superconducting cable passes before entering the termination of the subject invention.
Figure 2:
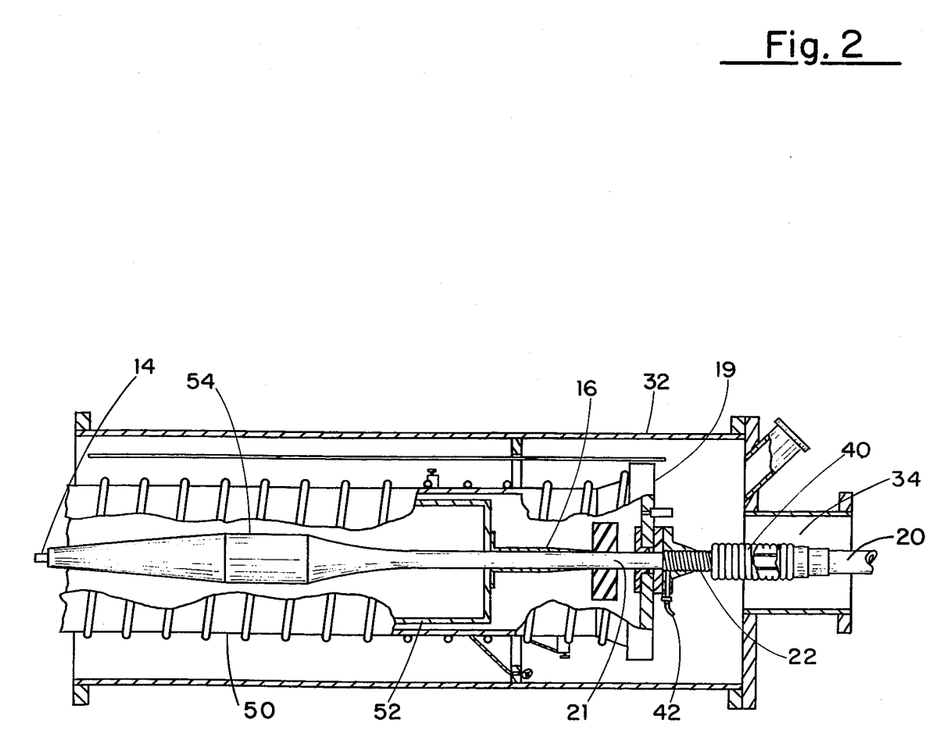
FIG. 2 is an axial view, partly in section and partly broken away, showing the connection of the superconducting cable to the cold end of the horizontal cryogenic bushing of the termination of the subject invention.

In FIG. 1, the helium pipe 20, enclosing a single phase superconducting cable, passes through the trifurcating vacuum chamber 30, and enters the termination vacuum enclosure. In FIG. 2, the helium pipe enters the termination vacuum enclosure 32 through opening 34. The helium pipe 20 includes an expansion bellows 40 and within the pipe is a gas tight cable jacket 22, which encloses the superconducting cable 21. The helium pipe 20 and the cable jacket 22 terminate at the pressure vessel flange 19, while the superconducting cable 21 continues into pressure vessel 50. The trifurcating vacuum chamber 30 shown in FIG. 1 and the termination vacuum enclosure 32 are connected to pumps (not shown) or other conventional means for maintaining a vacuum.

High pressure (15 atm) helium from the refrigerator is contained within the pressure vessel 50 and cable space inside the gas tight cable jacket 22. Low pressure (6 atm) helium from the expander (not shown) is returned to the refrigerator in the annular space between the cable jacket 22 and the helium pipe 20. The expanded helium can enter or leave this annular space through connecting pipe 42.

Within pressure vessel 50, cable outer conductor 16 is connected to current carrying means 52 which, in the embodiment shown, comprises a perforated copper cylinder concentric with pressure vessel 50. This cylinder conducts current from outer conductor 16 to the outer conductor assembly of the horizontal cryogenic bushing, shown in detail in FIG. 3.

Insulation is placed between inner conductor 14 and outer conductor 16 which comprises a screen layer of metalized plastic tape, preferably a polyimide such as Kapton ™, helically wound around many helically wound layers of plastic tape, preferably polypropylene, wound around inner conductor 14. Inner conductor 14 passes through an axial opening in stress cone 54 while the metallized plastic is continued up the exponentially curved surface of stress cone 54 while it is electrically connected to current carrying means 52. Since the metalized plastic is at the same potential as outer conductor 16, there is no potential gradient between current carrying means 52 and the exponential surface of stress cone 54 while the exponential shape keeps the voltage stress lines between inner conductor 14 and the surface of stress cone 54 normal to that surface preventing stress concentration and consequent breakdown. Thus, the stress cone transforms the relatively high voltage gradient between inner conductor 14 and outer conductor 16 into a lower gradient between current carrying means 52 and conductor 14. In general, stress cones are well understood by those skilled in the art and further discussion of their performance is not believed necessary to an understanding of the subject invention. Cable inner conductor 14 passes through stress cone 54 into the horizontal cryogenic bushing.

Figure 3:
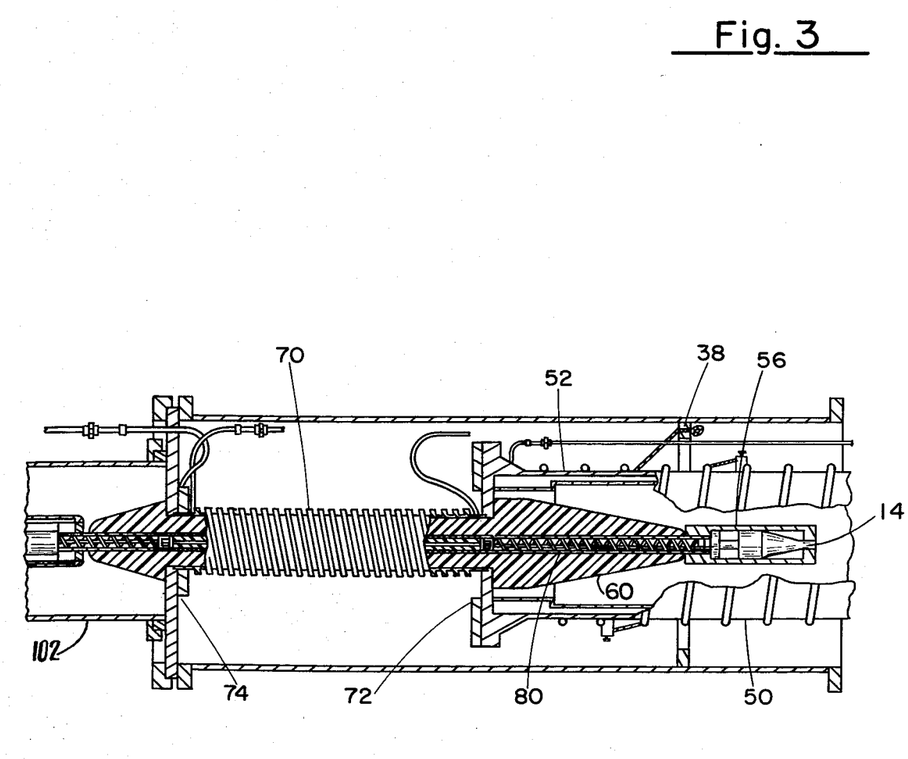
FIG. 3 is an axial view, partly in section and partly broken away, showing the superconducting cable passing from the cold end of the horizontal cryogenic bushing through the mid-section of the bushing and out the warm end of the horizontal cryogenic bushing.

Turning to FIG. 3, cable inner conductor 14 is mechanically and electrically connected to inner conductor assembly 80 of horizontal cryogenic bushing 60 by connector assembly 56. Connector assembly 56 is of an open design, such that the hollow core of inner conductor 14 communicates with the supercritical pressurized helium contained within pressure vessel 50. Pressure vessel 50 is in turn connected to either a refrigeration system or an expander (neither shown) so that the flow of helium coolant may be maintained through the cryogenic superconducting cable.

Cylinder 52 is electrically connected to outer conductor assembly 70 through flange 72. Preferably, the conecting surface of flange 72 and adjacent portion of cylinder 52 may be coated with a superconducting material such as niobium/tin to insure good connection and to minimize heat generation.

The major source of heat leakage is thus seen to be through the cryogenic bushings with the temperature gradient between the warm end at ambient temperature and the cool end at cryogenic temperatures being dissipated across bushing 60 in the portion between flanges 72 and 74. Other sources of heat are minimized by the use of insulating supports 38 to support pressure vessel 50 and multi-layer insulation over all cold surfaces.

Figure 4:
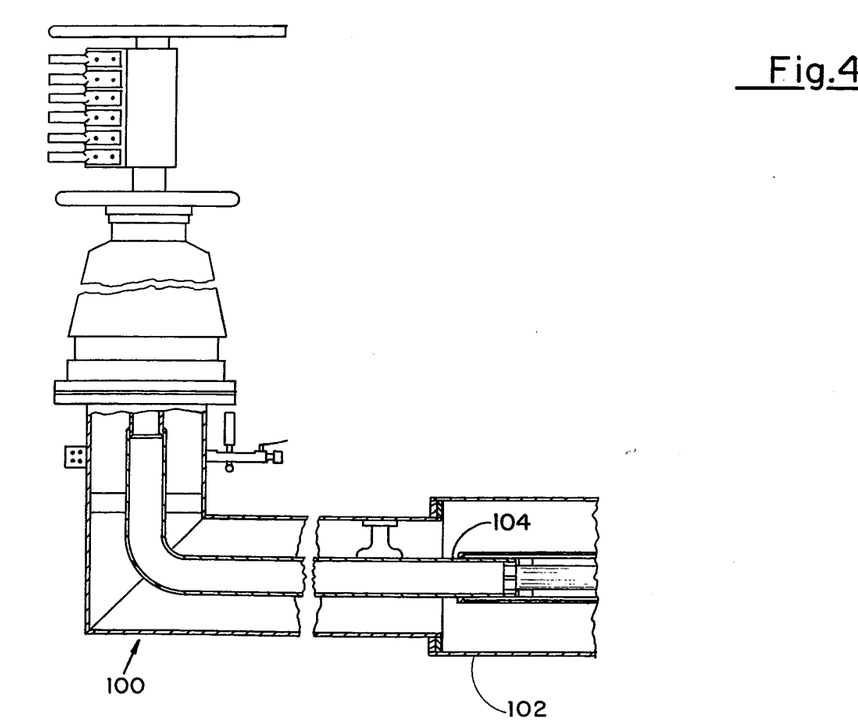
FIG. 4 is an axial view, partly in section and partly broken away, of the remaining portion of the termination system of the present invention showing the connection of the horizontal cryogenic bushing to a conventional air entrance bushing with elbow. It should be noted that if

The outer conductor assembly 70 is connected through flange 74 to the outer conductor shell of a conventional air entrance bushing with elbow. Turning to FIG. 4, there is shown outer conductor shell 102 of a conventional air entrance bushing with elbow 100. The inner conductor of the horizontal cryogenic bushing is connected to hollow inner conductor 104 of the air entrance bushing with elbow 100.

Figures 5, 5A, 5B:
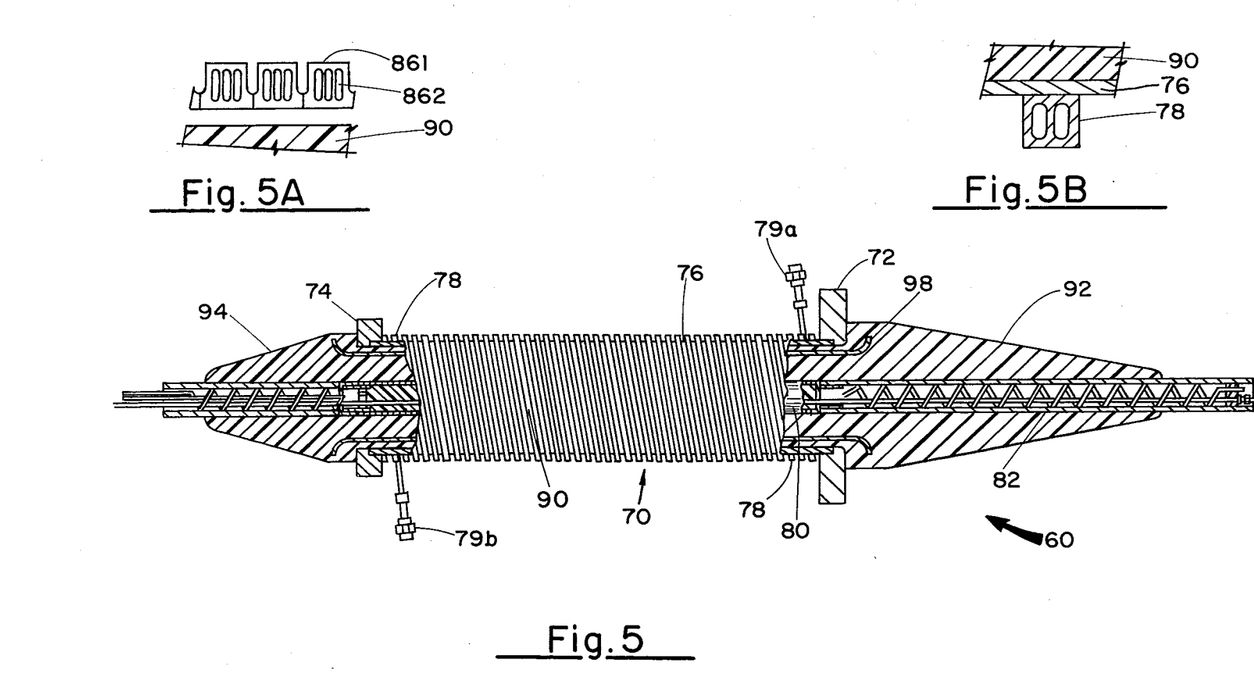
FIG. 5 is an axial section view of one embodiment of the horizontal cryogenic bushing of the subject invention.
FIGS. 5a and 5b are details showing the cross-section of the temperature transition section of the inner conductor and a cross-section of the heat exchanger in contact with the outer conductor tube respectively.

In FIG. 5 a more detailed axial view of cryogenic bushing 60 is shown. Outer conductor assembly 70 comprises a cylindrical conductive tube 76 electrically and mechanically connected to flanges 72 and 74. Flange 72 forms a leak tight seal around the opening in the pressure vessel (not shown) so that cold end portion 82 of inner conductor assembly 80 and cold end extension 92 of insulating structure 90 penetrate into pressure vessel 50. Heat exchanger 78 comprises a rectangular aluminum extrusion having internal channels for the flow of coolant, formed into a helix around and brazed to conductive tube 76 so as to form a good thermal connection between heat exchanger 78 and tube 76. A detailed cross-section of heater exchanger 78 is shown in FIG. 5b.

Heat exchanger 78 is connected to the pressure vessel (not shown) through piping 79a so that supercritical pressurized helium flows through heat exchanger 78, exiting through piping 79b. The flow rate is chosen so that, in conjunction with the cooling of the inner conductor assembly as will be described below, the temperature of bushing 60 is reduced from approximately ambient at the warm end flange 74 to a cryogenic temperature sufficiently low enough to maintain superconductivity along approximately one-third of the length of the cylindrical conductive tube 76.

Outer conductor 70 surrounds and forms a leak tight seal with insulating structure 90. In the embodiment shown, insulating structure 90 comprises an alumina filled epoxy casting having a conical cold end extension 92 and a similar conical warm end extension 94. Inner conductor assembly 80 passes through and forms a leak tight seal with insulating structure 90.

Extensions 92 and 94 taper from flanges 72 and 74 respectively to inner conductor assembly 80, and are designed to decrease the surface voltage stress of structure 90, which is exposed to either pressurized helium (extension 92) or $SF_6$ (extension 94), since breakdown in a gas occurs more readily along a surface than across a gap. Extension 92 is longer than extension 94, since $SF_6$ has a higher dielectric strength than helium.

As insulating structure 90 cures, some shrinkage occurs, which may cause a gap to occur between conductive tube 76 and the outer surface of insulating structure 90. Preferably, this gap is backfilled with more epoxy after curing, but some voids may remain. In use these voids may be filled by helium diffusing into them from the pressure vessel (not shown). To prevent a voltage gradient across these voids, a tubular conductive mesh screen 98 connected electrically to conductive tube 76 is embedded in insulating structure 90 adjacent to, coaxial with, and extending beyond conductive tube 76 and flanges 72 and 74, so as to shield any voids from the potential between inner conductor assembly 80 and outer conductor assembly 70. Voids between insulating structure 90 and outer conductor assembly 70 interfere with heat transfer from insulating structure 90 and may cause oscillations in the helium in the voids resulting in excessive axial heat leakage through bushing 60.

Figure 6:
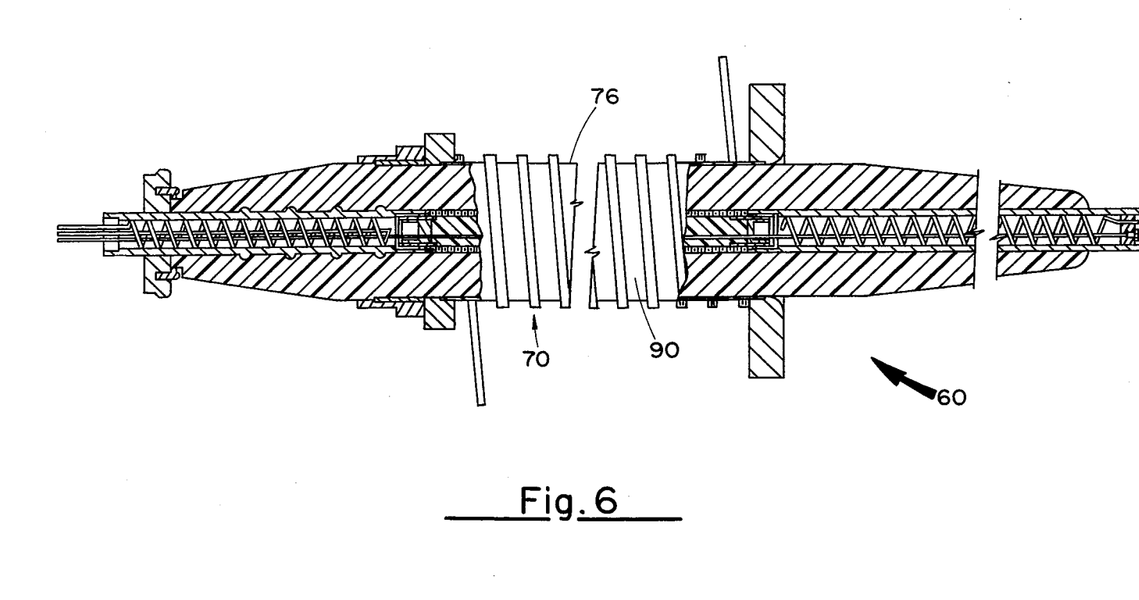
FIG. 6 is an axial section view of another embodiment of the horizontal cryogenic bushing of the subject invention.

In another embodiment of the horizontal cryogenic bushing of the subject invention, insulating structure 90 may be built up from laminations of paper impregnated epoxy. FIG. 6 shows a bushing 60 of the present invention constructed following this embodiment. Metallic conductive layers extend between layers to form a capacitively-graded structure, assuring a more uniform voltage gradient across structure 90 and reducing the possibility of breakdown. Preferably, when an insulating structure 90, in accordance with this embodiment, is installed in outer conductor assembly 70, an expandible compensation layer is installed between structure 90 and conductive tube 76 to allow for differing rates of radial and axial contraction between structure 90 and outer conductor assembly 70 and to block convection in helium in the space between them.

To offset the difference in the thermal expansion coefficients between the aluminum (or other metal) conductor and the laminated insulating structure used in the embodiment of the horizontal cryogenic bushing shown in FIG. 6, compensating layers are used at the interfaces between the insulating structure and the inner and outer conductor. This layer over the inner conductor is installed prior to casting the insulating structure, and includes compressible members that also allow for the shrinkage during curing of the insulating structure.

Figure 7:
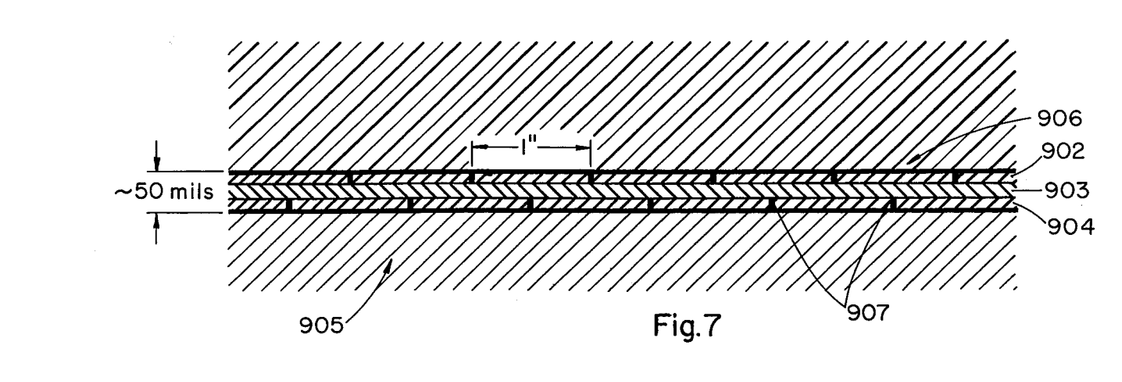
FIG. 7 is an axial view of the inner compensation layer of the embodiment of the cryogenic bushing shown in FIG. 6.

FIG. 7 shows the compensating layer applied over the inner conductor. In this case, a compressible layer 904, such as porous Teflon, is applied over the inner conductor assembly 905, by spirally wrapping, and fastened to the conductor by an adhesive, such as epoxy. Three layers of non-porous, thin, flexible Teflon tape 903 are applied in a single wrap, over the compressible layer. Teflon or other similar material was chosen because it remains flexible at operating temperatures and does not form a rigid bond with the adhesive used. A second compressible layer 902 is applied over the Teflon tape and is bonded to the insulating structure 906 during the casting process. Thus, layers 902 and 904 are preferably made from porous Teflon. The three central layers of unbonded Teflon tape permit relative motion axially between the insulating structure and the conductor during temperature changes. The insulating structure is fixed in place on the inner conductor at the warm end only. The layers are glued to a thin layer of epoxy 907 which mainly functions as a seal against helium flow in the axial direction.

Figure 8:
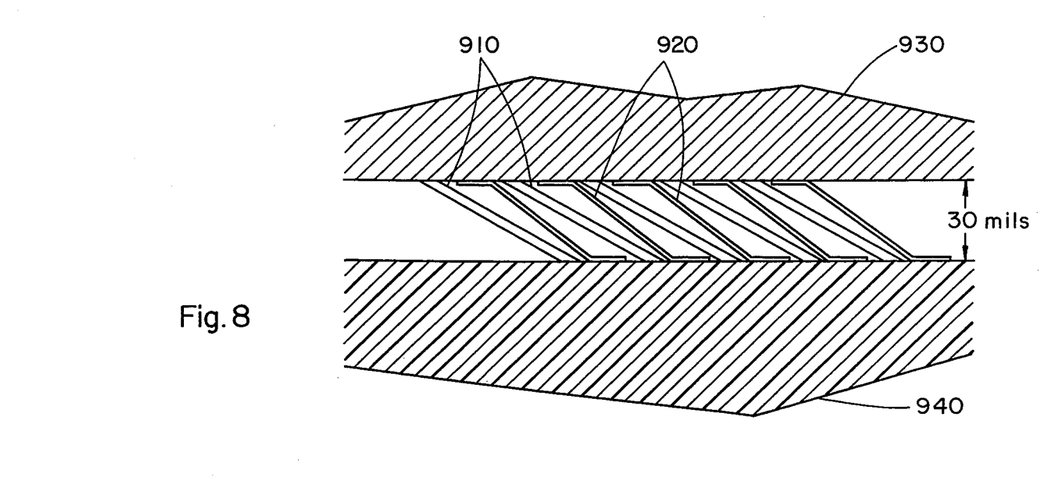
FIG. 8 is an axial view of the outer compensation layer of the embodiment of the cryogenic bushing shown in FIG. 6.

FIG. 8 shows the outer compensating means, applied over the insulating structure of the horizontal cryogenic bushing 60 shown in FIG. 6. In FIG. 8, one layer of Kapton tape 920 and two layers of Teflon tape 910 are applied in a single spiral wrap, over the insulating structure 940. The function of the outer compensating means is to prevent natural convection of the gas present in the gap between the insulating structure and the outer conductor by forming in the gap a cellular structure. The gap results entirely from the greater shrinkage of the insulating structure during cooling than of the outer conductor, since in this embodiment of the bushing, the insulating structure is not cast into the outer conductor, but is inserted, along with the outer compensating means, during assembly. The outer compensating means allows for relative motion without disrupting the cellular structure formed by the several layers of tape. The insulating structure is fixed in place on the outer conductor at the warm end only.

The overlap of each tape must be such that each tape can perform its required function. A portion of the Kapton must be exposed on each wrap so that it can be bonded to the insulating structure 940 along one edge and to the outer conductor 930 along the other edge. The two Teflon layers prevent bonding between the Kapton layers. The Kapton or other similar material was chosen because it remains flexible at operating temperatures are bonds well with the adhesive (such as epoxy) used.

Figure 9:
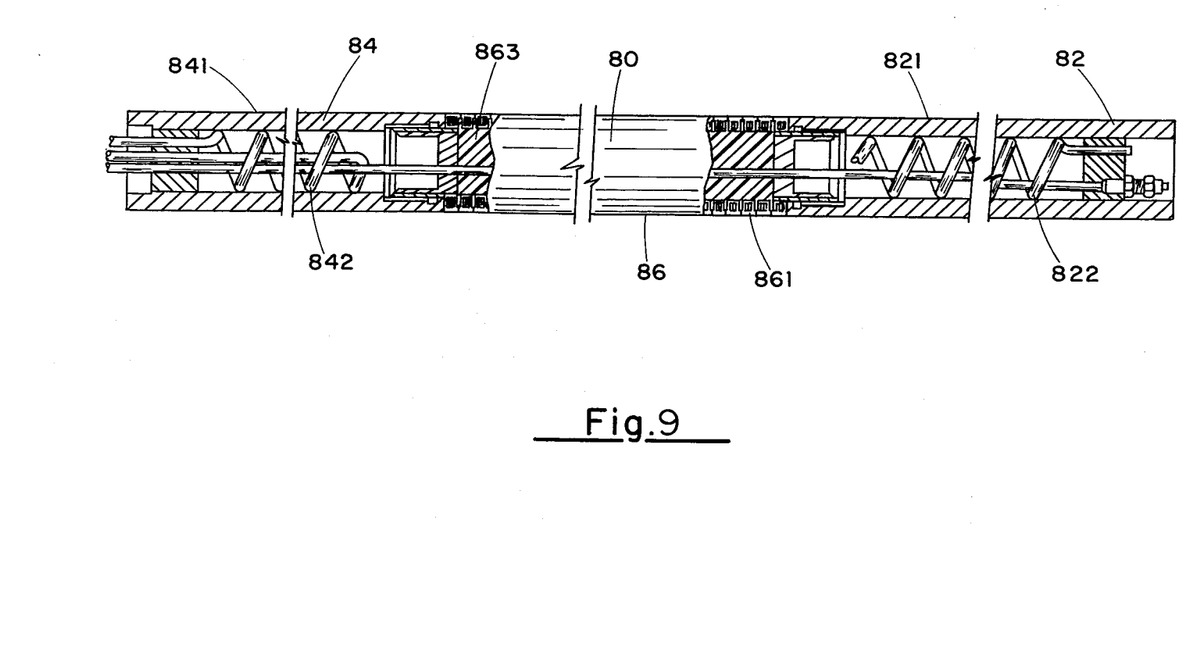
FIG. 9 is an axial section, showing the inner conductor assembly.

FIG. 9 shows an axial section of inner conductor assembly 80 for either of the embodiments of the horizontal cryogenic bushing 60, shown in FIGS. 5 and 6. The inner conductor assembly 80 is contained within the axial bore of the insulating structure of the bushing. Assembly 80 comprises cold end portion 82, warm end portion 84 and a temperature transition section 86 electrically connected to form a path for current flow from the inner conductor of the superconducting transmission cable to the hollow inner conductor of the air entrance bushing with elbow.

Cold end portion 82 further comprises a cylindrical aluminum tube 821 electrically and mechanically connected to the connector assembly of the bushing (not shown) at one end and to temperature transition section 86 at the other. Within tube 821, spiral, tubular heat exchanger 822 is brazed to the inner surface. One end of heat exchanger 822 is connected to the connector assembly of the bushing (not shown) so that pressurized supercritical helium flows into it from the pressure vessel (not shown). At the other end the helium flow discharges and flows into the channels of temperature transition section 86, as will be further described below.

Temperature transition section 86 comprises a "T"-shaped aluminum extrusion 861. This portion of temperature transition section 86 is shown in detail in FIG. 5a. As seen in FIG. 5a, extrusion 861 has a plurality of internal channels 862 for the flow of helium. Returning to FIG. 9, extrusion 861 is wound to form a helix with the flanges of the "T" on adjacent turns of the helix in contact. The helix so formed encloses an epoxy core 863 and is dip brazed so that it forms a unitary conductive path. The outer surface of cold end portion 82 and the adjacent one-third of the outer surface of transition section 86 are preferably covered with a layer of superconducting material (not shown) in order to reduce heat dissipation due to current flow in assembly 80.

Warm end portion 84 is electrically connected to the temperature transition section 86 and the hollow inner conductor of the air entrance bushing with elbow. It is comprised of a cylindrical hollow aluminum tube 841 containing heat exchanger 842. A water-glycol mixture or other suitable coolant approximately at ambient temperature is used as the heat exchanger fluid in heat exchanger 842 in order to stabilize the temperature of warm end portion 84.

In operation, the termination of the cryogenic superconducting transmission line, as described herein and depicted variously in FIGS. 1–9, nominally conducts a current of approximately 4,000 amperes at a potential of approximately 80 kilovolts rms from the cryogenic environment at a temperature of approximately 6 to 8 K. to the ambient environment. The horizontal cryogenic bushing must thus sustain a temperature difference of approximately 300° C. across the length between the flange at the cold end section and the flange at the warm end section of the bushing, a distance of approximately 84 cm, while minimizing heat leakage into the cryogenic region. This is achieved by the use of the same supercritical helium gas used to cool the superconducting power transmission cable. The following overview of the operation of the termination of the present invention refers to components depicted in FIGS. 1–9. Pressurized supercritical helium in pressure vessel 50 flows through connector assembly 56 and heat exchanger 822 into the channels of extrusion 861. After passing through extrusion 861 the helium, by then at ambient temperature, flows through tube 841 and hollow conductor 104, leaves air entrance bushing 100 through a return path to ground potential for recycling. Similarly, helium from pressure vessel 50 flows through piping 79a and heat exchanger 78 to exit piping 79b from which it is returned through a ceramic insert (not shown) to ground potential for recycling.

It should be noted that the design of the termination of the present invention not only provides for cooling bushing 60 with supercritical helium, but also advantageously provides means for introducing and removing a flow of such gas from inner conductor 14 of cable 21.

A flow rate of approximately 0.2 g/sec$^{-1}$ through heat exchanger 78 and inner conductor assembly 80 is chosen so that the transition from ambient temperature occurs over the section between flanges 72 and 74, with a temperature low enough to maintain superconductivity being reached approximately one-third of the way from cold end flange 72, and with a total heat flow through bushing 60 of almost zero, under normal operating conditions. This slight net heat flow is intercepted by the helium flow in heat exchanger 822. Since this heat load is expected to be small, a simple helical tubular design has been found to be adequate for heat exchanger 822.

Under light or no load conditions, the temperature transition may shift towards the warm end of bushing 60. Under these conditions warm end extension 94 may be cooled to temperatures low enough to freeze the $SF_6$ gas in air entrance bushing 100. To avoid this, heat exchanger 842, preferably using water/glycol, stabilizes the temperature; it thus removes heat from tube 841 and extension 94 under normal operating conditions and adds heat under light or no load conditions.

The structure of transition section 86 of inner conductor 80 should be particularly noted. The brazed helix formed from extrusion 861 provides an axial conductive path of minimal cross-sectional area. The cross-sectional area is further reduced by the partial separation between turns of the helix due to the "T" shape of extrusion 861. The multiple channels of extrusion 861 maximize the heat exchanger area. It is this high ratio of heat exchanger area to cross-sectional area in section 86 which allows the transition from ambient to cryogenic temperature to occur in a reasonable length over section 86 using supercritical helium gas. The helical heat exchanger path in the conductor equalizes the temperature of the upper and lower parts of the conductor, preventing vertical temperature gradients, and thus allows the termination of the subject invention to be operated with a horizontal orientation.

Another particular feature of the subject invention is the close thermal contact of conductor assemblies 70 and 80 with insulating structure 90 which allows heat to flow into assemblies 70 and 80 thus intercepting heat leakage through insulating structure 90.

Another particular feature of the embodiment of the horizontal cryogenic bushing 60 shown in FIG. 6 is the use of an expansion/compensation layer.

Thus, a termination for a superconducting power transmission line, which termination includes in part coaxial cryogenic bushings which generate no external magnetic field and which are capable of operation in a horizontal plane is shown. Although specific embodiments have been illustrated and described, it will be obvious to those skilled in the art that various modifications may be made without departing from the essence of the invention, which is intended to be limited solely by the appended claims.

We claim:

1. A cryogenic bushing (60) for transmitting electrical power from a cryogenic region to a region of higher temperature, said bushing comprising:
  (a) an outer conductor assembly (70), said assembly further comprising:
    (a1) a conductive tube (76);
    (a2) cold and warm end flanges (72,74), formed from a conductive material, electrically connected to the opposite ends of said conductive tube, said flanges being adapted to form a vacuum tight seal when fastened to an appropriate mating flange;
    (a3) first heat exchanger means (78), extending along and in thermal contact with said conductive tube, for removal of heat from said conductive tube;
  (b) an inner conductor assembly (80) within and coaxial with said outer conductor assembly (70), said inner conductor assembly further comprising:
    (b1) a cold end portion (82) extending beyond said outer conductor assembly; said cold end portion comprising a first hollow cylindrical conductor (821), a first means (56) attached to said first hollow cylindrical conductor for electrically and mechanically connecting said first hollow cylindrical conductor to the inner conductor (14) of a cryogenic, coaxial superconducting power transmission cable, a second means attached to said first hollow cylindrical conductor (821) for electrically connecting said first hollow cylindrical conductor to a conductor (861) having integral heat exchange capabilities; said cold end portion (82) having a coating of a superconductive material on the outer surface of said first hollow cylindrical conductor; and a second heat exchanger means (822) within and in thermal contact with said first hollow cylindrical conductor;
    (b2) a warm end portion (84) extending beyond said outer conductor assembly (70), said warm end portion comprising a second hollow cylindrical conductor (841), a first means attached to said second hollow cylindrical conductor for electrically and mechanically connecting said second hollow cylindrical conductor to the inner conductor (104) of a conventional power transmission cable terminating device (100) such as a conventional air entrance bushing, a second means attached to said second conductor (841) for electrically connecting said second hollow cylindrical conductor to the conductor (861) having integral heat exchanger capabilities, and a third heat exchanger means (842) within and in thermal contact with said second hollow cylindrical conductor;
    (b3) a temperature transition section (86) substantially coextensive with said outer conductor assembly (70), said section comprising a conductor (861) having integral heat exchange capabilities, said section being electrically connected to said cold and warm end portions, said connections also forming leak tight seals, whereby the coolant flow from said second heat exchanger (822) within the cold end portion flows through the channels and interior of the conductor (861) of the temperature transition section and on through the interior of said second hollow cylindrical conductor (841) in the warm end portion; and
  (c) a cylindrical insulating structure (90) substantially filling the space between said outer conductor assembly (70) and said inner conductor assembly (80) and forming a leak tight seal therewith, and substantially in thermal contact with said assemblies (70, 80) along their length, whereby said structure is cooled, said structure also having substantially coaxial cold end and warm end extensions (92, 94) beyond said outer conductor assembly, said extensions tapering from a maximum diameter near said flanges to said end portions (82, 84), whereby the possibility of breakdown between the inner and outer conductor assemblies (80, 70) along the surface of said structure is reduced.

2. A cryogenic bushing for transmitting electrical power from a cryogenic region to a region of higher temperature as recited in claim 1, wherein said conductor (861) having integral heat exchange capabilities comprises a section of a highly conductive material having good heat transfer characteristics, said section having a "T" shaped cross-section and at least one channel (862) through the length of said section for the flow of coolant; said section being formed in a tight spiral with the flanges of the "T" outwards, and the flanges of each turn of said spiral being in contact with the flanges of adjacent turns, whereby the surface of said spiral is substantially a cylinder with a continuous spiral joint formed by the flanges, said joint being leak tight so that said cylindrical surface forms a continuous axial conducting path; and the ends of said spiral being machined flat and at right angles with the cylinder axis so that said channels are circular and open to allow the flow of coolant through said conductor.

3. A conductor having integral heat exchanger capabilities comprising:
(a) a section of a highly conductive material having good heat transfer characteristics, said section having a "T" shaped cross-section and at least one channel through the length of said section for the flow of coolant; and
(b) a mandrel around which is wound said section of highly conductive material to form a tight spiral with the flanges of the "T" outwards and the flanges of each turn of said spiral being in contact with the flanges of adjacent turns, whereby the surface of said spiral is substantially a cylinder with a continuous spiral joint formed by the flanges, said joint being made leak tight so that said cylindrical surface forms a continuous axial conducting path; and the ends of said spiral being machined flat and at right angles with the cylinder axis so that said channel(s) are circular and open to allow the flow of coolant through said conductor.

4. A conductor of claim 3, wherein the highly conductive material used is aluminum.

5. A termination vacuum enclosure (32) enclosing a cryogenic bushing (60), a portion of a superconducting power transmission cable (21) that is effective to transmit electrical power from a cryogenic region through said bushing to a region having a higher temperature, and a coolant filled pressure vessel (50) that is operably mounted within said vacuum enclosure, said enclosure and enclosed components being characterized by the improvements comprising:
(a) current carrying means (52) disposed within said pressure vessel and operable to conduct electric current from an outer conductor (16) that is disposed around the cable (21) to an outer conductor assembly (70) mounted around a temperature transition section (86) of said bushing (60);
(b) a stress cone (54) disposed around a portion of said cable (21) and coaxially positioned within in and radially spaced from said current carrying means (52), said stress cone being electrically connected to said current carrying means (52);
(c) a connector assembly (56) that is disposed within said pressure vessel (50), between said stress cone (54) and said bushing (60), and being effective to electrically connect an inner conductor (14) of the cable (21) to an inner conductor assembly (80) of the bushing (60); said connector assembly having an opening that is effective to enable coolant within the pressure vessel (50) to communicate with said inner conductor (14) of the cable (21); and
(d) a conically shaped cold end extension (92) and a conically shaped warm end extension (94) on opposite ends of said bushing (60), said cold end extension (92) being mounted within the said pressure vessel (50) and in leak tight sealing relationship with a flange (72) on the pressure vessel 50, said warm end extension (94) being mounted outside of vacuum enclosure (32) in said region of higher temperature, and in sealing relationship with a second flange (74) on said vacuum enclosure (32).

6. An invention as defined in claim 5 wherein said flange (72) is effective to electrically connect current carrying means (52) to said outer conductor assembly (70).

7. An invention as defined in claim 5 wherein said outer conductor assembly (70) surrounds and forms a leak tight seal with an insulating structure (90) of said bushing (60), between said conical cold end extension (92) and said conical warm end extension (94) thereof.

8. An invention as defined in claim 7 wherein said outer conductor assembly (70) comprises a conductive tube (76) that is electrically connected to said flange (72) and to the second flange (74).

* * * * *